Oct. 28, 1952   C. H. FAY ET AL   2,616,020
AUTOMATIC TEMPERATURE CONTROL
Filed March 7, 1950

Inventors: Charles H. Fay
Richard R. Goodell
By  *[signature]*
His Attorney

Patented Oct. 28, 1952

2,616,020

UNITED STATES PATENT OFFICE 2,616,020

AUTOMATIC TEMPERATURE CONTROL

Charles H. Fay and Richard R. Goodell, Houston, Tex., assignors to Shell Development Company, San Francisco, Calif., a corporation of Delaware Application March 7, 1950, Serial No. 148,238

3 Claims. (Cl. 219—20)

This invention relates to thermostatic temperature control, and pertains more particularly to a self-adjusting thermostatic heater system.

It is an object of this invention to provide an automatic system of thermostatic control wherein the heat-supplying elements also carry the functions of heat-sensing elements to regulate the amount of heat supplied to the system and to maintain the system at a rigorously constant predetermined temperature.

It is also an object of this invention to provide a system of thermostatic control which has no droop in its operating characteristics.

It is also an object of this invention to provide a thermostatic heater system capable of operating substantially without thermal lag under widely varying conditions of ambient temperature.

It is also an object of this invention to provide a thermostatic heater for systems requiring a relatively small input of power, as is desirable when operating said system in remote or difficultly accessible places, for example, when thermostating an extremely sensitive instrument, such as a gravity meter, which may be submerged under the surface of the sea or lowered into a deep well, as described in our patent applications such as Serial No. 57,758, filed November 1, 1948, now Patent 2,570,659.

These and other objects of the present invention will be understood from the following description, taken with reference to the attached drawings, wherein.

Figure 1:
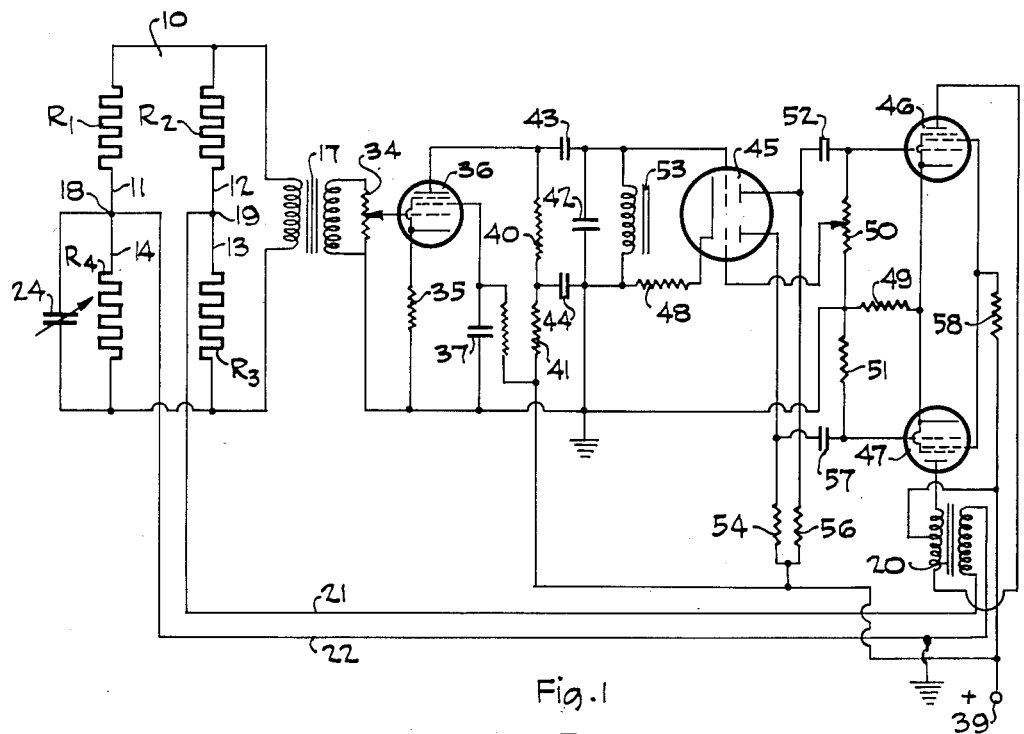
Fig. 1 is a schematic diagram of the electrical circuit of the present system.

Referring to Fig. 1, four or more resistors, such for example as shown at $R_1$, $R_2$, $R_3$ and $R_4$, are connected to form the four arms 11, 12, 13 and 14 of a balancing bridge such as a Wheatstone bridge, having its output terminals connected to the primary of a transformer 17, and its input terminals 18 and 19 connected through leads 21 and 22 to the secondary of a transformer 20. A variable condenser may be connected across one or more of said resistances, as shown at 24, to facilitate the vectorial balancing of the bridge.

Figure 2:
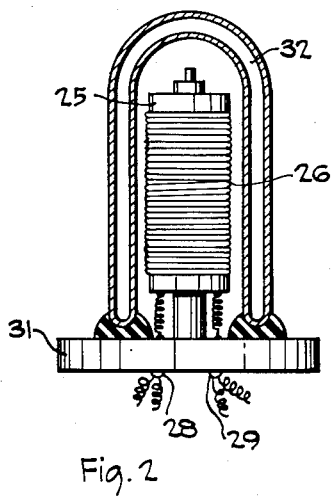
Fig. 2 shows the heater and temperature control elements of the present system wound on an instrument or instrument part which it is desired to maintain at a predetermined constant temperature.

The resistors $R_1$, $R_2$, $R_3$ and $R_4$ are the heater elements by means of which heat is actually supplied to the thermostat system. Fig. 2 shows by way of illustration a physical embodiment of an application of the present invention. A tubular housing such as shown at 25, containing for example the spring of a gravity meter, which it is desired to maintain at a rigorously constant temperature, such as ±0.001° C. at 120° C., is provided on the outside with a winding 26, consisting of the resistances $R_1$, $R_2$, $R_3$ and $R_4$ properly connected to each other and to the other parts of the system of Fig. 1, for example, through terminals such as shown at 28 and 29, carried by a base or support 31. This whole structure is further thermally insulated from outside temperatures by means of a suitable cover 32, which may be of the vacuum flask type, the thermostat space or zone proper being thus contained within said cover.

Two of the heater resistors, for example, the resistors $R_1$ and $R_3$, forming the two conjugate arms 11 and 13 of the bridge, are made of a wire of a metal having a temperature coefficient of resistivity different from that of the metal used to make the wires of the resistors $R_2$ and $R_4$, forming the two other conjugate arms 12 and 14 of the bridge. For example, resistors $R_1$ and $R_3$ may have a large temperature coefficient of resistivity, while resistors $R_2$ and $R_4$ have a small one. Especially good control may be obtained by making resistors $R_1$ and $R_3$ of a metal having a positive, and preferably a large positive coefficient of resistivity, such as nickel, iron, silver, tungsten, etc., or any suitable alloy comprising these metals, while the resistors $R_2$ and $R_4$ are made of a metal having a small negative temperature coefficient of resistivity at temperatures above 100° C., such for example as manganin, or suitable alloy thereof.

Since a Wheatstone bridge is balanced when the product of the resistances of two conjugate arms thereof equals the product of the resistances of its two other arms, that is, when $R_1R_3=R_2R_4$, the ohmic value of the resistors $R_1$, $R_2$, $R_3$ and $R_4$ is chosen so that at some predetermined and preferably relatively low temperature, for example, at room temperature, the product of the resistances $R_1$ and $R_3$ is smaller than that of the resistances $R_2$ and $R_4$.

Since, under these conditions, a rise of temperature will tend to increase the resistance value of $R_1$ and $R_3$ while decreasing the resistance product of $R_2$ and $R_4$, or, in any case, to increase the resistance product of $R_1$ and $R_3$ at a higher rate than that of $R_2$ and $R_4$, it follows that at a second predetermined temperature the resistances of the two pairs of conjugate arms will become equal, and the bridge will balance, while at still higher temperatures the value of $R_1R_3$ will become greater than $R_2R_4$ and the bridge will be again unbalanced, but in an opposite sense or direction. Thus, the bridge is made to operate as a thermostat with an unbalance potential or current output proportional to deviations of temperature from a predetermined value.

The transformer 17 serves as input to a high-gain amplifier circuit which together with the balancing bridge constitutes also an oscillator circuit.

Since, as will be readily understood by those familiar with electronics, various types and modifications of feed-back amplifier-oscillator circuits may be equally well used for the purposes of the present invention, the particular circuit shown in Fig. 1 will be only briefly described here for illustration purposes.

The voltage appearing at the transformer 17, that is, a voltage due to any unbalance of the bridge 10, is applied, through a potentiometer 34, to the grid of an amplifier tube 36, receiving its D. C. plate potential through resistances 40 and 41 from a terminal 39, supplying operating energy to the whole system.

Connected to the output of tube 36 by means of the tuned circuit 42 and 53, and isolated from the D. C. supply thereof by means comprising condenser 43, is a double triode tube 45 in a phase inverter circuit, whose output is in turn supplied to the push-pull amplifier tubes 46 and 47, the voltage balance of the phase inverter being provided through a network comprising resistances 49, 50 and 51. The output of push-pull tubes 46 and 47 is applied to a transformer 20, which serves to energize the Wheatstone bridge 10 and to supply the desired amount of heat to the resistors $R_1$, $R_2$, $R_3$ and $R_4$.

It will be seen that when the high-gain amplifier circuit is connected to the bridge 10 as shown in Fig. 1, transient effects will cause a random voltage to appear at the output transformer 20 of the amplifier and energize the bridge. Assuming that the bridge is cool at that moment, and the product of resistors $R_1$ and $R_3$ has a value below that of resistors $R_2$ and $R_4$, an unbalance voltage will be applied to the input transformer 17 of the amplifier. If this voltage is of the proper polarity, it will be transmitted with suitable amplification to the output transformer 20 of the amplifier and thus to the input of the bridge, and will add to the effect of the random voltage which had originally energized the bridge and had caused it to produce an unbalance output potential. Thus the bridge and amplifier circuits will operate as an oscillator whose output will keep building up as long as the bridge remains unbalanced in the original sense or direction.

Since there is power applied to the input terminals of the bridge, the temperature of its resistance elements will be raised, causing the bridge to approach balance, as has been explained hereinabove. As the bridge approaches balance, the input to the amplifier circuit becomes smaller until it is just sufficient to maintain the oscillations. For example, if the amplifier circuit has a gain of 100,000, the output voltage of the bridge is .00001 of its input voltage. For a bridge used according to the present invention for thermostatting a gravity meter adapted to be lowered into a well, this corresponds, for example, to a temperature of 0.01° C. below the temperature required to balance the bridge.

Considering now the effect of rising ambient temperatures, that is of the temperatures of the zones or spaces surrounding the resistors or heaters of the present system, it will be seen that with a rise of the ambient temperature the bridge resistors must be heated to a higher temperature to dissipate a given amount of heat. The bridge will thus tend to approach balance and the oscillations will begin to die out, this process continuing until the system reaches the predetermined thermostatting temperature at which oscillation is barely maintained. It will be seen that the voltage of the amplifier under these conditions of high ambient temperature will have a smaller value than at the low original temperature in view of the reduced amount of heat dissipation from the resistors and the correspondingly reduced amount of power required to compensate for said dissipation.

It must be particularly noted that the present system operates substantially without any droop in its characteristics, the temperature of the resistors remaining substantially constant regardless of ambient temperatures, whereas conventional thermostats normally operate to correct for an error signal, the thermostat temperature thus necessarily changing as the ambient temperature changes.

The present system has also an extremely fast response. Since the heating elements act also as temperature-sensing elements, there is practically no thermal lag in the action of the system. As an illustration, if the resistor wires $R_1$, $R_2$, $R_3$ and $R_4$ are simply coiled in air, without being supported on a core, the system may be made to hunt at a rate of 30 cycles per second, which is an extremely fast action for a thermal cycle. With the same resistor wires wound on a core, such as a brass tube, no hunting can be detected.

As implied above, it is preferable to use a tuned amplifier circuit with the present system. The reason for this is that if the bridge becomes sufficiently overheated, oscillations are possible at a frequency where there is a 180° phase shift in the amplifier. Using a tuned amplifier circuit reduces the gain at these frequencies to a point where oscillations cannot build up.

Although reference has been made hereinabove to the use of the present thermostat in combination with devices such as underground or undersea gravity meters, it is clearly understood that this has been done merely for illustration purposes, and that the present system is fully susceptible of any other desired application in installations requiring the maintenance of strictly constant temperatures, either underground or on the surface.

We claim as our invention:

1. A thermostat system comprising heater resistor means connected to form a first pair of conjugate arms in a balancing bridge, second heater resistor means connected to form a second pair of conjugate arms in said bridge, the resistor means in the first pair of conjugate arms having a resistance respectively lower and higher than the resistor means in the second pair of conjugate arms at temperatures respectively lower and higher than a predetermined balance temperature, the resistor means in the first pair of conjugate arms having a temperature coefficient of resistivity larger than that of the resistor means in the second pair of conjugate arms, a tuned high-gain amplifier circuit comprising a phase inverter and a push-pull amplification stage having its input connected to the output of said bridge and its output connected to the input of said bridge, said tuned amplifier circuit being responsive to bridge unbalance voltages of proper polarity for supplying to the bridge variable amounts of oscillating heating current necessary for just maintaining the system in oscillation at the predetermined temperature.

2. The system of claim 1, wherein one of the pairs of conjugate arms comprises resistor means formed of a metal having a positive temperature coefficient of resistivity, and the other pair of conjugate arms comprises resistor means formed of a metal having a negative temperature coefficient of resistivity.

3. The system of claim 1, wherein one of the pairs of conjugate arms comprises resistor means formed of a metal of the group consisting of nickel and nickel alloys having a positive temperature coefficient of resistivity, and the other pair of conjugate arms comprises resistor means formed of a metal of the group consisting of manganin.

CHARLES H. FAY.
RICHARD R. GOODELL.

REFERENCES CITED

The following references are of record in the file of this patent:

UNITED STATES PATENTS

| Number | Name | Date |
|---|---|---|
| 2,086,966 | Shrader | July 13, 1937 |
| 2,093,745 | Westell | Sept. 21, 1937 |
| 2,154,862 | Olshevsky | Apr. 18, 1939 |
| 2,189,462 | Donle et al. | Feb. 6, 1940 |
| 2,406,715 | Strickland | Aug. 27, 1946 |
| 2,556,065 | Callender | June 5, 1951 |